United States Patent
Stibel et al.

(10) Patent No.: US 9,087,340 B1
(45) Date of Patent: Jul. 21, 2015

(54) BUILDING INTELLIGENCE FROM CUSTOMER RELATIONSHIP MANAGEMENT EVENTS

(71) Applicant: Credibility Corp., Malibu, CA (US)

(72) Inventors: Aaron B. Stibel, Hidden Hills, CA (US); Garrett Arnett, Simi Valley, CA (US)

(73) Assignee: Credibility Corp., Malibu, CA (US)

(*) Notice: Subject to any disclaimer, the term of this patent is extended or adjusted under 35 U.S.C. 154(b) by 0 days.

(21) Appl. No.: 14/666,603

(22) Filed: Mar. 24, 2015

Related U.S. Application Data

(63) Continuation of application No. 14/487,800, filed on Sep. 16, 2014, now Pat. No. 8,996,395.

(51) Int. Cl.
G06Q 10/00 (2012.01)
G06Q 30/00 (2012.01)
G06Q 30/02 (2012.01)

(52) U.S. Cl.
CPC .................................. G06Q 30/0201 (2013.01)

(58) Field of Classification Search
CPC ................................................. G06Q 30/0201
USPC ............................................... 705/7.11–7.42
See application file for complete search history.

(56) References Cited

U.S. PATENT DOCUMENTS

| | | | |
|---|---|---|---|
| 7,406,436 B1* | 7/2008 | Reisman | 705/7.32 |
| 8,396,732 B1* | 3/2013 | Nies et al. | 705/7.12 |
| 8,879,719 B2* | 11/2014 | Zgardovski et al. | 379/266.07 |
| 2002/0099561 A1* | 7/2002 | Wilkins et al. | 705/1 |
| 2004/0249650 A1* | 12/2004 | Freedman et al. | 705/1 |
| 2005/0216421 A1 | 9/2005 | Barry et al. | |
| 2008/0103856 A1* | 5/2008 | Ciszkowski et al. | 705/7 |
| 2008/0240376 A1 | 10/2008 | Conway et al. | |
| 2010/0318400 A1 | 12/2010 | Geffen et al. | |
| 2012/0259722 A1 | 10/2012 | Mikurak | |
| 2013/0191185 A1 | 7/2013 | Galvin | |
| 2014/0081702 A1* | 3/2014 | Rohde et al. | 705/7.29 |
| 2014/0314215 A1 | 10/2014 | Duva et al. | |

* cited by examiner

Primary Examiner — Sujay Koneru
(74) Attorney, Agent, or Firm — Los Angeles Patent Group; Arman Katiraei

(57) ABSTRACT

Some embodiments provide a data intelligence extraction system for extracting intelligence from different events that are generated by separate and independently operating event generating sources within a business, wherein each event generating source records some set of business activities and the data associated with those activities. The intelligence that the system extracts includes a cradle-to-grave accounting for the engagement that different entities have with a business over the entirety of the entity-to-business relationship. This cradle-to-grave accounting is formed by the system linking events that are related causally, temporally, or on the basis of an entity to which they relate. The system then constructs data assets to capture the data from the linked events, and in so doing, provide the business with assets that compile the data the business has obtained on the different entities over the cradle-to-grave engagement with those entities.

15 Claims, 10 Drawing Sheets

BUILDING INTELLIGENCE FROM CUSTOMER RELATIONSHIP MANAGEMENT EVENTS

CLAIM OF BENEFIT TO RELATED APPLICATIONS

This application is a continuation of U.S. non-provisional application Ser. No. 14/487,800 entitled "Building Intelligence from Customer Relationship Management Events", filed Sep. 16, 2014. The contents of application Ser. No. 14/487,800 are hereby incorporated by reference.

TECHNICAL FIELD

The present invention pertains to data organization and data management.

BACKGROUND

Businesses amass large quantities of data based on customer relationship management (CRM) events that transpire during daily operations. CRM events can include any recordable act or action. Events can record high level actions such as the completion of a sale. Events can also record low level actions such as a mouse click performed by a sales representative in order to add to or modify some data record.

The data that is associated with an event defines that event. For example, an event may capture a sales representative placing an outbound call to a potential customer. The data defining such an event can include information identifying the sales representative, information identifying the potential customer, the telephone contact number of the potential customer, a time the outbound call is initiated, a time the outbound call is terminated, and a disposition of the call as some examples.

For any enterprise or large scale business, the challenge is how to extract meaningful intelligence from the collection of CRM events and their associated data. The CRM events often reside in multiple repositories. For example, the finance department of a particular business may have its own repository storing billing related events, while the sales department of the particular business has its own independent repository storing sales related events. The fact that one billing event may be derived from one sales event is hidden by virtue of the separation and independent operation of the different business units.

Accordingly, there is a need to extract intelligence from seemingly unrelated and independent events. Stated differently, there is need to link events in a manner that identifies the temporal or causal effects that bring about the events. There is then a need to leverage the linkage in order to extract the cradle-to-grave life cycle that occurs across the related set of events as well as to build and retain data about different entities.

SUMMARY OF THE INVENTION

Some embodiments provide a business data intelligence extraction system. Such a system interfaces with different event generating sources within a business, each source generating customer relationship management (CRM) events recording acts or actions transpiring within different business units and business processes. Specifically, each event is associated with data that defines the acts or actions captured by the event. The system aggregates the events, cleanses the associated data, and derives intelligence from the data that results after matching two or more different events based on related data associated within each of the matched events.

In some embodiments, the system constructs data assets from the derived intelligence. Each data asset is a compilation of data about a different entity. Specifically, each data asset is a compilation of data that the business obtains about a different entity throughout the cradle-to-engagement between the business and the entity. In some embodiments, the system populates the data asset with identifying, historical, and financial information that the business collects on the entity from different events generated over the cradle-to-grave engagement between the business and the entity. In so doing, the data asset becomes a central source of compiled data about an entity that is cleansed to identify that entity's complete engagement with the business even though the engagement may occur in a piecemeal fashion with different business units. The data asset becomes a commodity that can be sold to parties seeking information about various entities.

In some embodiments, the system is configured to retrieve (1) call events generated by a call system used by a business for logging and placing outbound calls as well as for logging and receiving inbound calls and (2) internal events generated by representatives of the business. Each call event is automatically generated by a call system of the business. Each call event records an identifier for the caller and optional information such as the business representative that responds to the call and the duration of the call. The call events may be disassociated with sales activity and other activity occurring within the business. Such activity is recorded by internal events. In some embodiments, the interval events record the actions taken by the business representatives whether in response to a call event or some other occurrence within the business. As some examples, the interval events can record a business representative taking some action, entity profiles that the representative retrieves, when the profiles are retrieved, and disposition from an interaction between a representative and a customer.

The system builds and extracts intelligence from these events by matching call events, internal events, and any other events based on data commonality and by compiling the data from any matched call events and internal events into various data assets. To match the events, the system parses the data from the events in order to identify, for example, a representative that is identified in a call event and an internal event with the timestamp of both events overlapping with one another. Alternatively, a match can be based on a common business that is identified in a call event and an internal event.

The system is self-learning because it continually builds upon the data it compiles for any given entity. Initially, the system may have no data on a given entity. Once the system is able to match at least two events that contain data about the given entity, the system is able to generate a data asset based on the data from the two events. The system then adds to the data asset with data from other matching events as those events are matched to the given entity. Over time, the data asset grows, providing the system with more data about the given entity than it previously had. Moreover, the growth of the data asset improves the ability of the system to match future events to the given entity as it has a larger set of data from which it can identify the matches.

The system is also self-learning because it continually verifies the accuracy and validity of the data asset data as events are continually matched to different data assets. In some embodiments, the data asset verification is based on event quantity and event quality. Event quantity identifies the number of times certain data is present within events that are matched to a particular data asset. If certain data repeats in two or more matched events, then the system verifies the data on the basis of commonality and consistency. Event quality relates to usage of and actions taken with respect to event data. For example, a call event contains a telephone number and the call event may be directed to a particular entity, however to verify that the telephone number actually belongs to the particular entity, the system inspects other data of the call event to determine the length of the call. Based on the call length, the system determines whether the telephone number is accurate and valid. For example, if the call length is less than ten seconds, the system cannot verify the accuracy of the telephone number because the particular entity may have been unreachable or the telephone number was an incorrect number to a different entity. However, if the call length is over a minute, the system verifies that the telephone number belongs to the particular entity. In some embodiments, the system filters each data asset to present verified data therein while hiding or otherwise identifying other data as being unverified.

In generating the data assets, the system automatically acquires and builds on information that is already known about an entity. The data assets can reveal multiple contact telephone numbers or other identifying information for the same business or entity, behavior patterns of the business or entity, as well as temporal and causal links for different events identified for the same business or entity.

BRIEF DESCRIPTION OF THE DRAWINGS

In order to achieve a better understanding of the nature of the present invention a preferred embodiment will now be described, by way of example only, with reference to the accompanying drawings in which:

FIG. 2 illustrates two exemplary event generation sources that the data intelligence extraction system 120 of some embodiments operates in conjunction with.

DETAILED DESCRIPTION OF THE INVENTION

In the following detailed description, numerous details, examples, and embodiments are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which the invention can be practiced. It is to be understood that other embodiments can be used and structural changes can be made without departing from the scope of the embodiments herein described.

Figure 1:
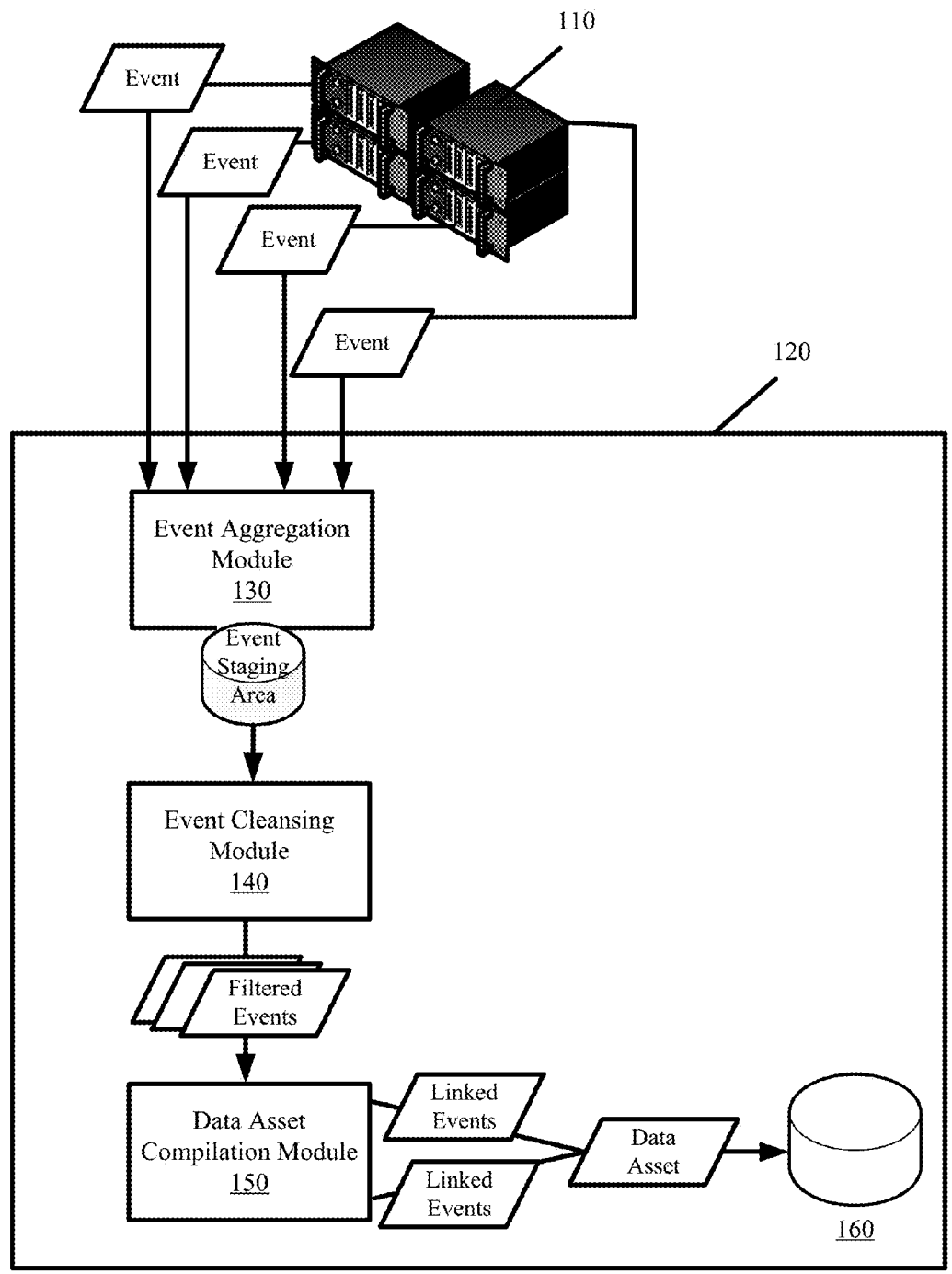
FIG. 1 presents an exemplary architecture in which the data intelligence extraction system of some embodiments is implemented.

FIG. 1 presents an exemplary architecture in which the data intelligence extraction system of some embodiments is implemented. The architecture includes two or more event generating sources 110 and the data intelligence extraction system 120 with an event aggregation module 130, an event cleansing module 140, a data asset compilation module 150, and a data asset electronic database 160.

The event generating sources 110 are tasked with tracking different activities occurring within a business or enterprise. The tracked activities can include anything of informational value or interest to the business. The tracked activities can record acts or actions undertaken between business representatives, customers, and partners of the business. Each event generating source 110 tracks a different set of activities as events. Accordingly, a business can have a first event generating source for generating sales events to track business sales, a second event generating source for generating communication events to track incoming and outgoing communications, and a third event generating source for generating internal events to track activities performed by business representatives.

Each event records data that is associated with a tracked activity. The event data includes identifying information for business representatives, customers, and partners that are engaged in performance of the tracked activity as well as identifying information for the activity itself. The events and tracked data are fully customizable to allow the business to track activities at a high-level or at a low-level depending on the business preferences. A high-level activity that is tracked to an event can include a product sale, whereas a low-level activity that is tracked to an event can include individual computer interactions such as mouse clicks, key presses, menu selections, etc. by business representatives.

A business may rely on different event generating sources 110 to track desired sets of activities because different departments or groups within the business may want different tracking, independent tracking, or control over what is tracked. A business may also rely on different event generating sources 110 because different third parties provide specialized event generating sources that satisfy different event tracking needs of the business.

The event generating sources 110 may operate independent of one another. The event generating sources 110 can be a single point system in which two or more event generating sources 110 operate on the same physical machine or on different machines at the same location. The event generating sources 110 can also be distributed systems, wherein each source generates events using machines at two or more different locations.

Figure 2:
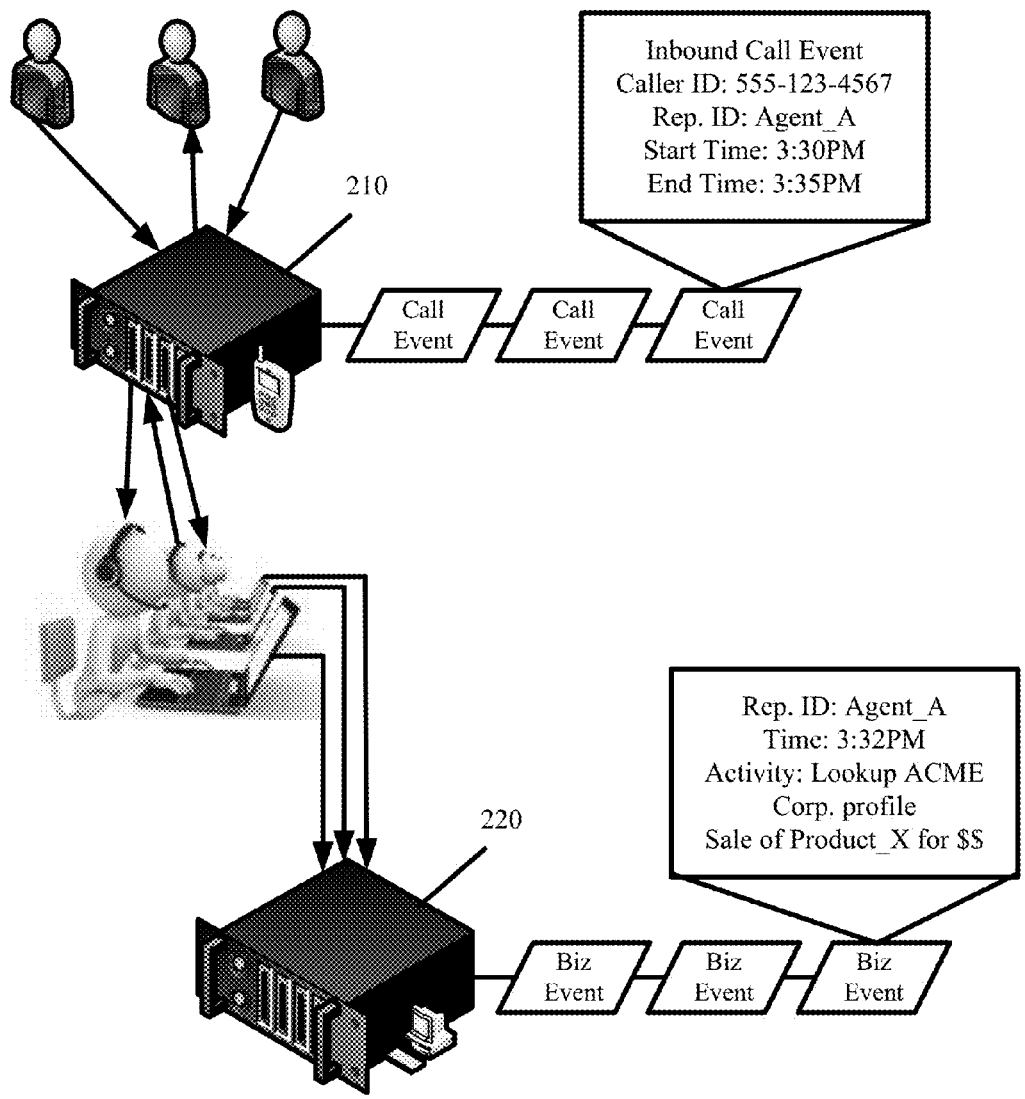

FIG. 2 illustrates two exemplary event generation sources that the data intelligence extraction system 120 of some embodiments operates in conjunction with. The event generation sources include a call center event generating source 210 and an internal business event generating source 220.

The call center event generating source 210 is configured to track inbound and outbound call activity for a business. The call center event generating source is typically a third-party solution. Such third-party solutions are highly specialized for their purpose and are more cost effective than having a business develop its own proprietary system.

The call center event generating source 210 automatically generates a call event for any inbound telephone call that is placed to the business and any outbound call that is placed by a business representative to external entities. The call center event generating source 210 automatically populates each event with data that is associated with the call. The data can include any of an identifier identifying either the external entity being called or the external entity placing the call, an identifier identifying either the business representative receiving the call or placing the call, timestamps identifying when the call was placed, when the call ended, and a duration of the call, an identifier for a campaign associated with the telephone call, an identifier associating the telephone call with a particular entity, and a disposition of a call including whether the call ended in a sale, cancellation, and renewal as some examples. Certain data may not be automatically populated by the call center event generating source 210 for all call events.

The internal business event generating source 220 is configured to track activities of the business representatives. In some embodiments, the internal business event generating source events track each engagement between an external entity and a business representative. The engagement can include a business representative retrieving an entity profile for an entity that is communicating with the business representative. For example, the business representative may receive an incoming call from the particular entity that is tracked to a call event. However, during the call, the business representative may retrieve the entity profile for that particular entity using a DUNS number or some other unique identifier. The retrieval of the entity profile by the business representative can be recorded to an internal business event along with information such as the time the profile was retrieved, the agent retrieving the profile, etc. In some embodiments, the internal business event generating source events can be used to track sales activity including any new sales, cancellations, or renewals entered by the business representatives. The data for these events may include an identifier identifying the entity engaged in the sales activity, an identifier identifying the business representative, products involved, information requested or provided by the external entity, transaction amounts, billing information, and order identifier as some examples.

Due to the different roles of the call center event generating source 210 and the internal business event generating source 220, the data tracked to the events generated by these sources will differ in some capacity. This holds true for the data that is recorded to events generated by other event generating sources of a business. Each event generating source typically stores its own generated events to a separate repository such that the events of the different sources are not linked in any way and exist independent of one another.

Some other event generating sources include mail marketing event generating sources and email marketing event generating sources. The mail marketing event generating sources generate events that track direct mail marketing campaigns. Each such event is associated with data identifying the campaign involved, the external entity responding to a mailer, billing information, products, order identifiers, and mailing address as some examples. Email events contain data for activities relating to an email campaign.

The data intelligence extraction system 120 of some embodiments extracts intelligence from the event data produced by the different event generating sources of a business. The intelligence is a byproduct of the data intelligence extraction system 120 being able to identify commonality in the otherwise independent events from the different event generating sources and to link the events based on the identified commonality. From the links, the system 120 is able to account for the cradle-to-grave engagement between the business and different entities and from this engagement, the system 120 derives intelligence in the form of improved reporting, analytics, entity behavior modeling, and entity preferences. From the links, the system 120 is also able to generate data assets. Each data asset represents intelligence that the business compiles for a given entity during the cradle-to-grave engagement with that entity. In other words, any information that the business learns on a particular entity during its cradle-to-grave cycle with that entity is not stored in a piecemeal fashion in separate events and in separate repositories, but is aggregated in a single data asset that can be used at any time to holistically and comprehensively describe the entity.

With reference back to FIG. 1, the event aggregation module 130 of the data intelligence extraction system 120 interfaces with each of the event generating sources 110 of a given business in order to aggregate the events generated by those sources 110. To do so, the event aggregation module 130 communicably couples to each of the event generating sources 110 over a data network. The event aggregation module 130 authenticates and authorizes itself in order to access the events from each of the event generating sources 110. The event aggregation module 130 retrieves the generated events from the sources 110. The retrieved events are placed in a temporary staging area. In some embodiments, the temporary staging area is non-transitory computer-readable local storage of the data intelligence extraction system 120. The event aggregation module 130 can regularly or periodically perform the event retrieval. Depending on the number of generated events, the event aggregation module 130 can retain in the local storage a full history of all generated events by the various event generating sources 110 of the business or retain the events from a specific period of time (e.g., one week, one month, one year, etc.).

The event cleansing module 140 of the data intelligence extraction system 120 preprocesses the retrieved events. The preprocessing standardizes the data values and formatting of the retrieved events as value ranges and formatting used by the various event generating sources 110 may be different. As a simple example, a telephone number may be formatted in an event from a first source as (xxx)xxx-xxxx and may be formatted in an event from a second source as xxxxxxxxxx. The event cleansing module 140 reformats the data from both events to be of the common format xxx-xxx-xxxx. Another example is to convert time in various events that are recorded according to different time zones to a standard time zone. Other tasks of the event cleansing module 140 can include filtering invalid data and events and removing events that do not involve an external entity such as events related to calls placed between different business representatives.

Figure 3:
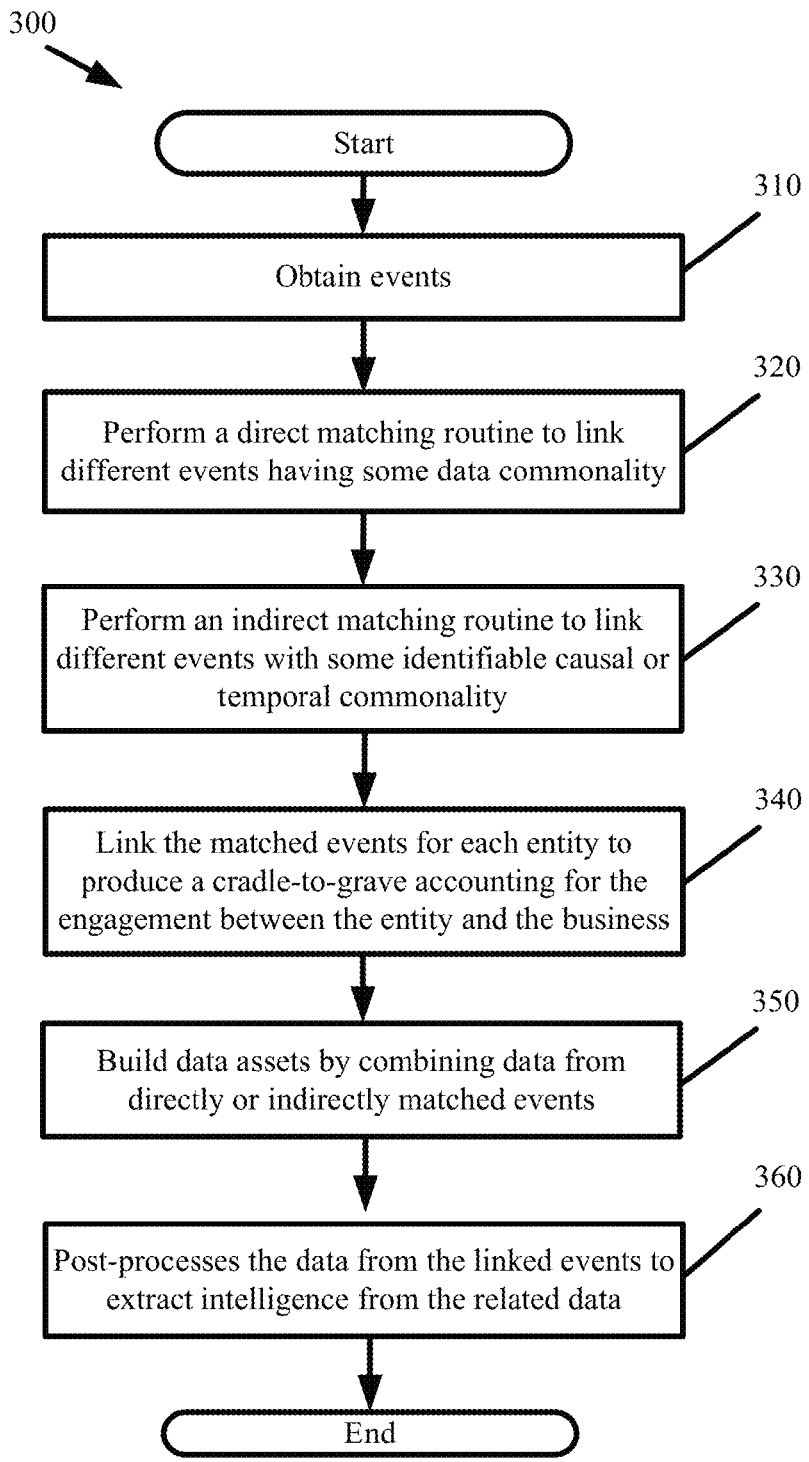
FIG. 3 presents a process 300 performed by the data asset compilation module 150 for extracting intelligence from the cleansed events in accordance with some embodiments.

Next, the data asset compilation module 150 of the data intelligence extraction system 120 executes using the cleansed events in order to extract intelligence from the events. FIG. 3 presents a process 300 performed by the data asset compilation module 150 for extracting intelligence from the cleansed events in accordance with some embodiments.

The process commences by obtaining (at 310) the cleansed events from the event cleansing module. The process then performs (at 320) a direct matching routine to link different events having some data commonality. Specifically, the direct matching links events from different sources that are related to the same activity. For example, a call event may include data identifying a particular entity telephone number or a particular entity customer and the same data may be found in an internal sales event created by a representative of the business. The process also performs (at 330) an indirect matching routine to link different events that do not necessarily have data commonality, but that have some identifiable causal or temporal commonality.

The process links (at 340) the matched events for each entity to produce a cradle-to-grave accounting for the engagement between the entity and the business. Specifically, from all linked events of a particular entity, the business can identify the complete engagement it has had with that particular entity across all its business units in one place. Previously, this information would be disjoint and disassociated, and exist as separate events in the different event generating sources across the business.

The process then builds (at 350) data assets by combining data from directly or indirectly matched events into a single data construct. In other words, the previously disparate data from the matched events become related as a result of the matching.

The process also post-processes (at 360) the data from the linked events to extract intelligence from the related data. In some embodiments, the extractable intelligence includes deriving accurate reporting and analytics, comprehensive data about an entity, its behavior, or its preferences, and a holistic cradle-to-grave accounting of an entity's engagement with the business. Given the sheer number of events that a business generates, the intelligence extraction does not lend itself to manual operation and the automated and computer implemented data intelligence extraction system of some embodiments is used for these specific purposes.

Event linking for the cradle-to-grave accounting, data assets, and extracted intelligence is stored to the data asset electronic database 160. The business and its representatives can then access the cradle-to-grave accounting, data assets, and extracted intelligence from the data asset electronic database 160.

Examples of the direct and indirect event matching, cradle-to-grave accounting of entity engagement, and building of the data assets as performed by the data intelligence extraction system 120 of some embodiments are now provided. These examples are not exhaustive and are provided to illustrate some of the system operation and function.

Figure 4:
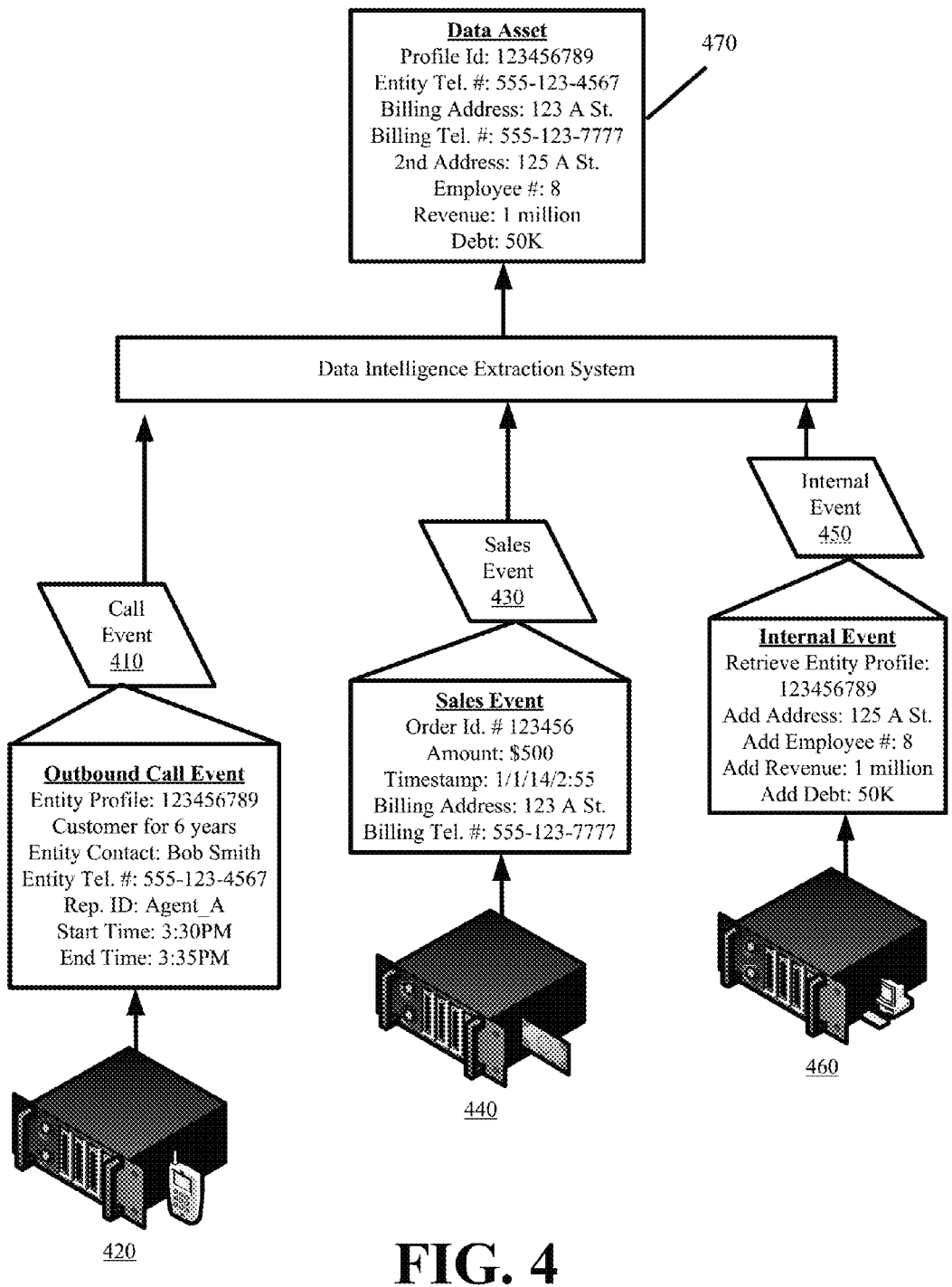
FIG. 4 illustrates directly matching events from different event generating sources of a business, linking the events, and generating a data asset from the directly matched events in accordance with some embodiments.

FIG. 4 illustrates directly matching events from different event generating sources of a business, linking the events, and generating a data asset from the directly matched events in accordance with some embodiments. The figure illustrates a first call event 410 generated by a first event generating source 420 of the business, a second sales event 430 generated by a different second event generating source 440 of the business, a third internal event 450 that is generated by a different third event generating source 460 of the business, and a data asset 470 generated by the data intelligence extraction system using the data from the events 410, 430, and 450.

The first call event 410 identifies an outbound call that a business representative places to a particular entity. Data associated with the first call event 410 includes a unique identifier, such as a DUNS® number that is associated with a profile of the particular entity. The retrieved profile contains a first telephone number for contacting the particular entity and other information that is useful to the business representative when placing the call.

The second sales event 430 identifies a product that was purchased by the particular entity identified by the unique identifier. The second sales event 430 includes billing information that the particular entity provides in order to complete the purchase. The billing information specifies a first billing address and a second telephone number of the particular entity that was not previously known or provided in the first call event 410.

The third internal event 450 records the activity of the business representative when contacting the particular entity. The activity includes the business representative retrieving the particular entity profile using the unique identifier. The activity further includes identifying information about the business of the particular entity that the business representative enters into his computer terminal when speaking with the particular entity. In this example, the identifying information includes a second location address that is different than the first billing address, the business's number of employees, revenue, and debt.

The first 410, second 430, and third 450 events are directly matched because of the inclusion of the same unique identifier within the data of each event. The data intelligence extraction system builds a data asset 470 to compile the data the business has acquired on the particular entity through its repeated engagement with the particular entity. The data asset 470 can include all or subsets of the aggregated data. In this figure, the system builds the data asset 470 by compiling the first telephone number from the first call event 410, the second telephone number and the first billing address of the particular entity from the second sales event 430, and the second location address, number of employees, revenue, and debt from the third internal event 450. Previously, this data would reside separately in the different events of the different event generating sources of the business (e.g., 420, 440, and 460). However, the data asset 470 compiles into one construct all or the important information that the business learns about the particular entity throughout repeated engagements between the entity and different business units. From the data asset 470, one can directly identify the first and second telephone numbers as well as the first and second addresses for contacting the particular entity without having to scour the different events 410, 430, and 450 and event generating sources 420, 440, and 460 of the business.

Figure 5:
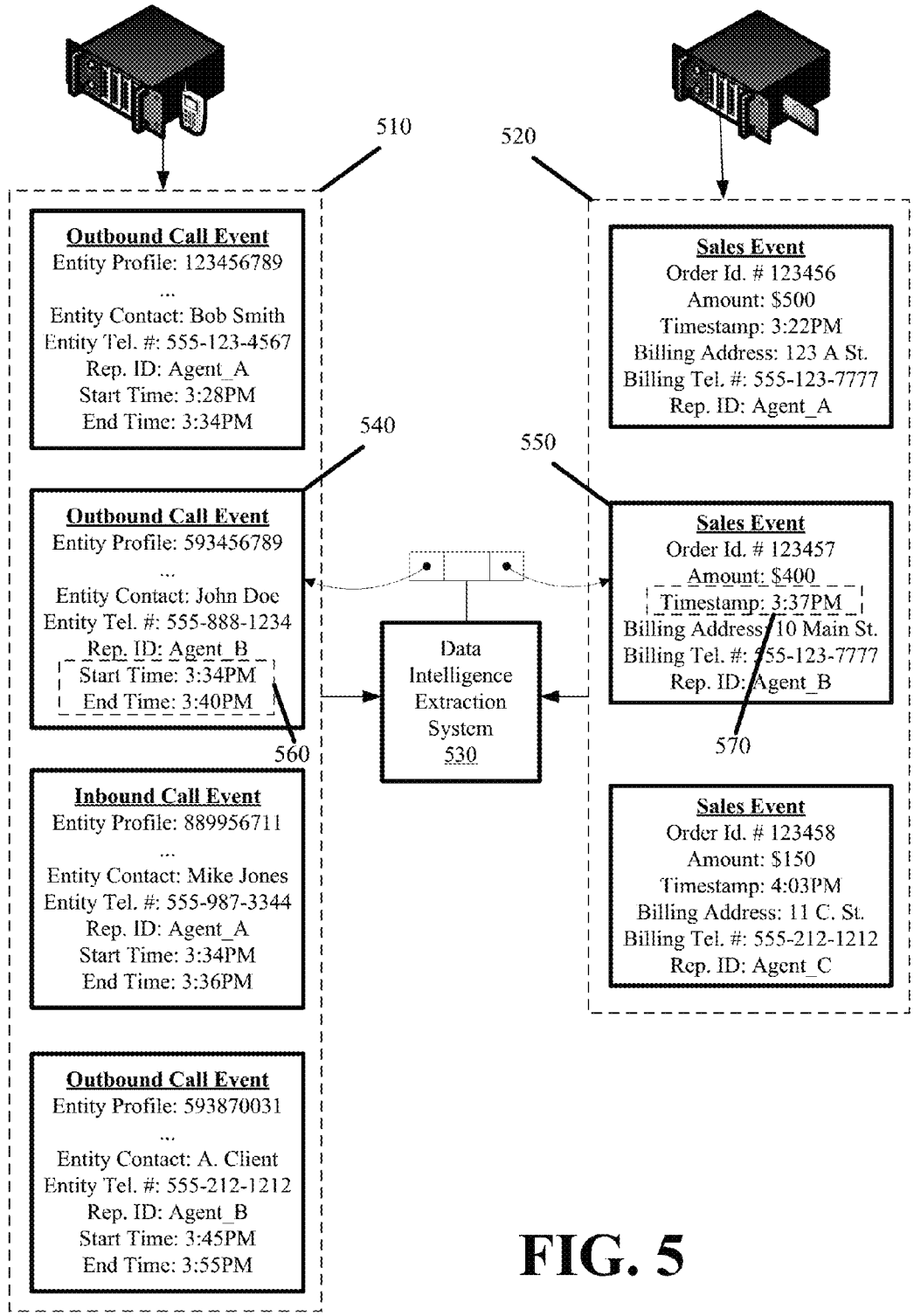
FIG. 5 illustrates indirectly matching events from different event generating sources of a business based on temporal commonality in accordance with some embodiments.

FIG. 5 illustrates indirectly matching events from different event generating sources of a business based on temporal commonality in accordance with some embodiments. This figure illustrates a set of call events 510 and a set of sales events 520 with the data intelligence extraction system 530 of some embodiments indirectly matching a call event 540 from the set of call events 510 that is seemingly unrelated to a sales event 550 from the set of sales events 520 with the different sets of events 510 and 520 being generated by different sources within a business.

The call event 540 identifies an outbound call made by a particular business representative to a first entity, a profile of a first business that was retrieved during the call, and a time of the call 560. The sales event 550 identifies a completed sale by the particular business representative for a product or service at a time 570 that overlaps with the time 560 of the call event 540.

The data intelligence extraction system 530 aggregates both sets of events 510 and 520 from the different event generating sources of the business. The system 530 indirectly matches the events 540 and 550 by identifying the temporal overlap between the call event 540 and the sales event 550 and that both events 540 and 550 identify the same business representative. The system 530 links the indirectly matched events 540 and 550 such that the data from one can be used in conjunction with the data of the other. Intelligence can be extracted from the link. For example, the call to sale ratio or conversion ratio can be determined. A data asset can also be generated from the data of the indirectly matched events 540 and 550.

Figure 6:
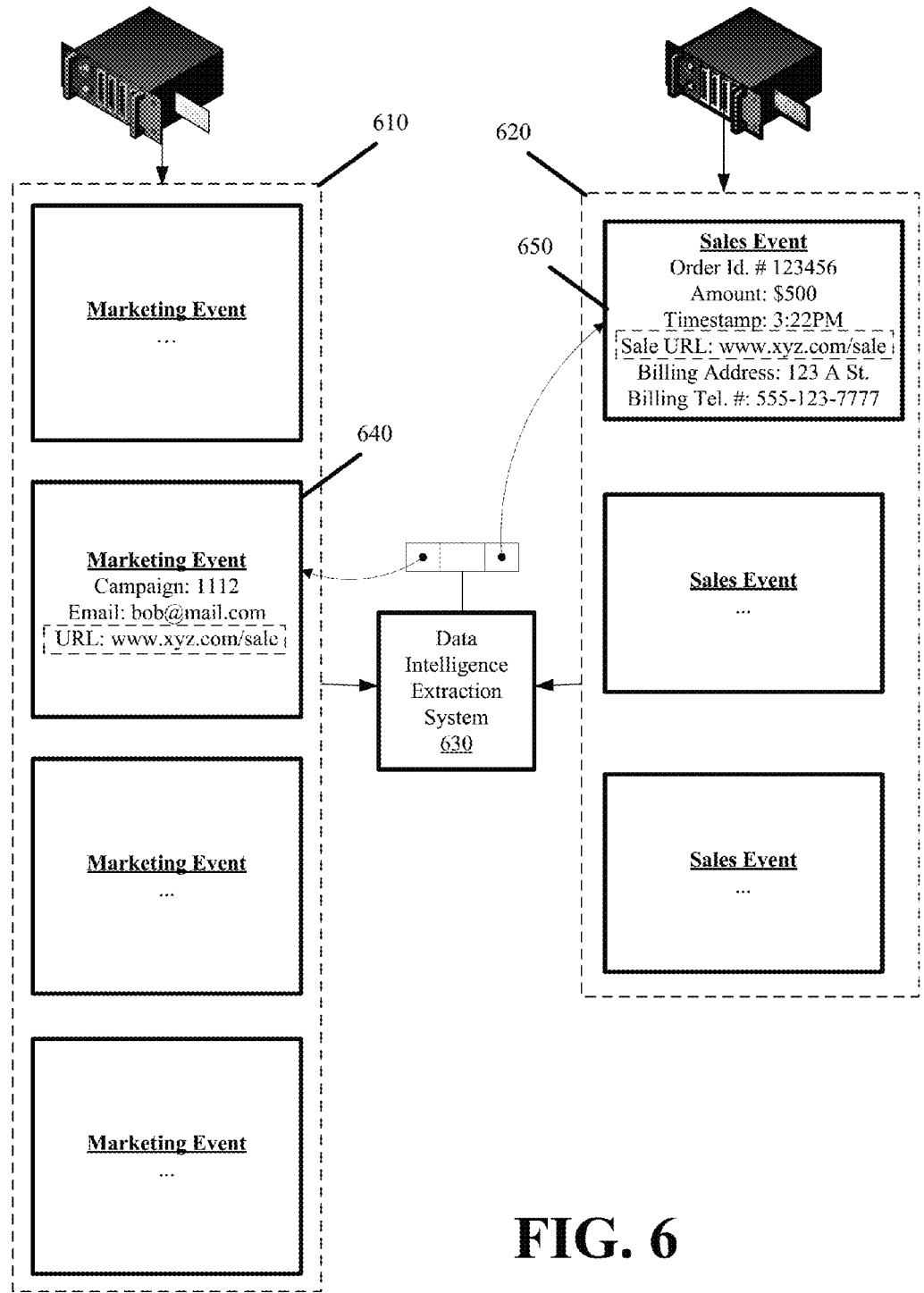
FIG. 6 illustrates indirectly matching events from different event generating sources of a business based on causal commonality in accordance with some embodiments.

FIG. 6 illustrates indirectly matching events from different event generating sources of a business based on causal commonality in accordance with some embodiments. This figure illustrates a set of marketing events 610 and a set of sales events 620 with the data intelligence extraction system 630 of some embodiments indirectly matching a marketing event 640 from the set of marketing events 610 to a sales event 650 from the set of sales events 620 because of causality. The set of marketing events 610 are generated by a first source to record the sending of a promotional email containing a URL to different email addresses of different entities. The set of sales events 620 are generated by a second source to record sales of products and services to different entities and data associated with each sale.

The data intelligence extraction system 630 aggregates and processes the sets of events 610 and 620. In processing the sets of events 610 and 620, the data intelligence extraction system 630 identifies that events 640 and 650 are causally related because the sales event 650 results from the marketing event 640. Specifically, the customer would not have known about the URL where the sale was made but for the sending of the marketing event 640 to the customer. The indirect matching because of causality allows the data intelligence extraction system to improve reporting and analytics for the business by better identifying how one action conducted by the business affected the sales of the business. An example of the improved reporting provided by the data intelligence extraction system of some embodiments is provided by FIG. 7 below.

Figure 7:
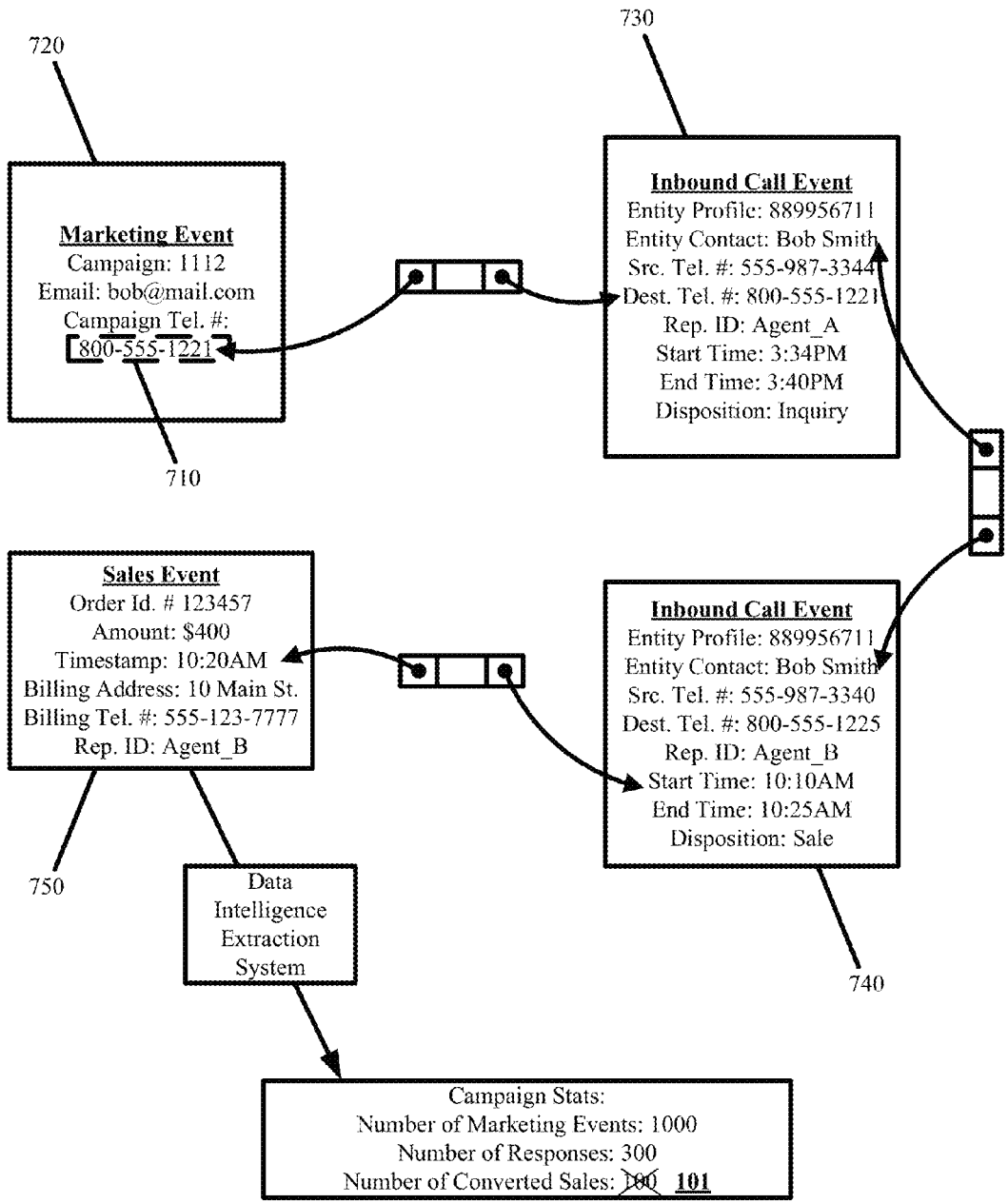
FIG. 7 conceptually illustrates using data from different events that have been linked by the data intelligence extraction system as a result of the matching in order to improve business reporting and analysis for the business.

FIG. 7 conceptually illustrates using data from different events that have been linked by the data intelligence extraction system as a result of the matching in order to improve business reporting and analysis for the business. The business conducts a marketing campaign that is associated with an identifier 710. In this figure, the identifier 710 is a specific telephone number used by the business to track effectiveness of the marketing campaign, though the identifier 710 can also be any of an email address, street address, Uniform Resource Locator (URL), or other website address. The business advertises a product or service and the specific telephone number. Different marketing events track the campaign dissemination.

Normally, the business would track the effectiveness of the campaign solely based on sales resulting from calls to the specific telephone number. Specifically, the number of call events identifying inbound calls to the specific telephone number provides an estimate of interest generated by the campaign, and any such call events where the disposition is a completed sale can be used to compute the campaign conversion rate. However, this reporting fails to account and include those customers that dialed the specific telephone number to inquire about the product and then either called back through a different telephone number (e.g., a direct number of a business representative) or were contacted later by a business representative with this second contact leading to a completed sale.

As shown in FIG. 7, the system resolves this inaccuracy based on links established between a marketing event 720 that provided the specific telephone number for the campaign to an entity, a first call event 730 placed by the entity to the specific telephone number in which the entity expressed interest in the product or service but did not complete a sale, a second call event 740 in which the entity calls a different telephone number and purchases the product or service, and a sales event 750 that captures the purchase data. From these linked events, the system is able to identify that the sale was in fact due to the marketing campaign and should be included as part of the campaign results. As such, the system updates to campaign results to record the purchase as a sale converted due to the marketing campaign.

The linking also provides a cradle-to-grave accounting of the engagements that the entity had with different business units. The linking allows a business representative to view this entire history by either searching for the entity or by viewing one of the events. More importantly, the business representative does not need to separately search a call event generating source of the business and a sales event generating source of the business to arrive at this cradle-to-grave accounting for the engagement between the business and the entity.

In some embodiments, the cradle-to-grave accounting of the engagement with different entities is used by the data intelligence extraction system to extract intelligence on user behavior. In some such embodiments, the system aggregates the cradle-to-grave accounting for different users that have purchased a specific service from the business. For each entity, the cradle-to-grave accounting identifies all events leading up to the sale of the specific service and all events that transpired thereafter. This includes events identifying which entities canceled the specific service, renewed the specific service, or purchased additional services. This system then analyzes the entity data in order to identify any trends or commonality between the entities that renewed or purchased additional services from the entities that canceled the specific service. The extracted user behavior can then be used by the business to target future marketing efforts on those entities that have a higher conversion rate.

The data assets promote a self-learning system. With every newly matched event, the system is able to append data from the matched event to a data asset, thereby growing the information the system collects about the entity identified by that data asset. Moreover, as the data asset grows, the system is provided a larger set of data from which to identify matches with other events.

Over time, it is possible that a data asset becomes populated with multiple entries for the same data instance or one or more mismatched items of data. In such instances, the system needs to not only add data to the data asset, but cull the data asset to prioritize or filter the data therein. For example, the system may identify and collect two or more telephone numbers for a given entity. However, one of those telephone numbers is a primary telephone number that the system should distinguish to assist business representatives in contacting the given entity. Similarly, the system may identify and collect two or more mailing addresses for the given entity. However, the system should distinguish the primary mailing address to ensure that any sent mailers are deliverable to the entity without delay.

In some embodiments, the system operates in a self-learning manner to verify the accuracy and validity of the data within each of the data assets. In some such embodiments, the system verifies data assets based on quantity and quality of the events that contribute data to the data assets.

Figure 8:
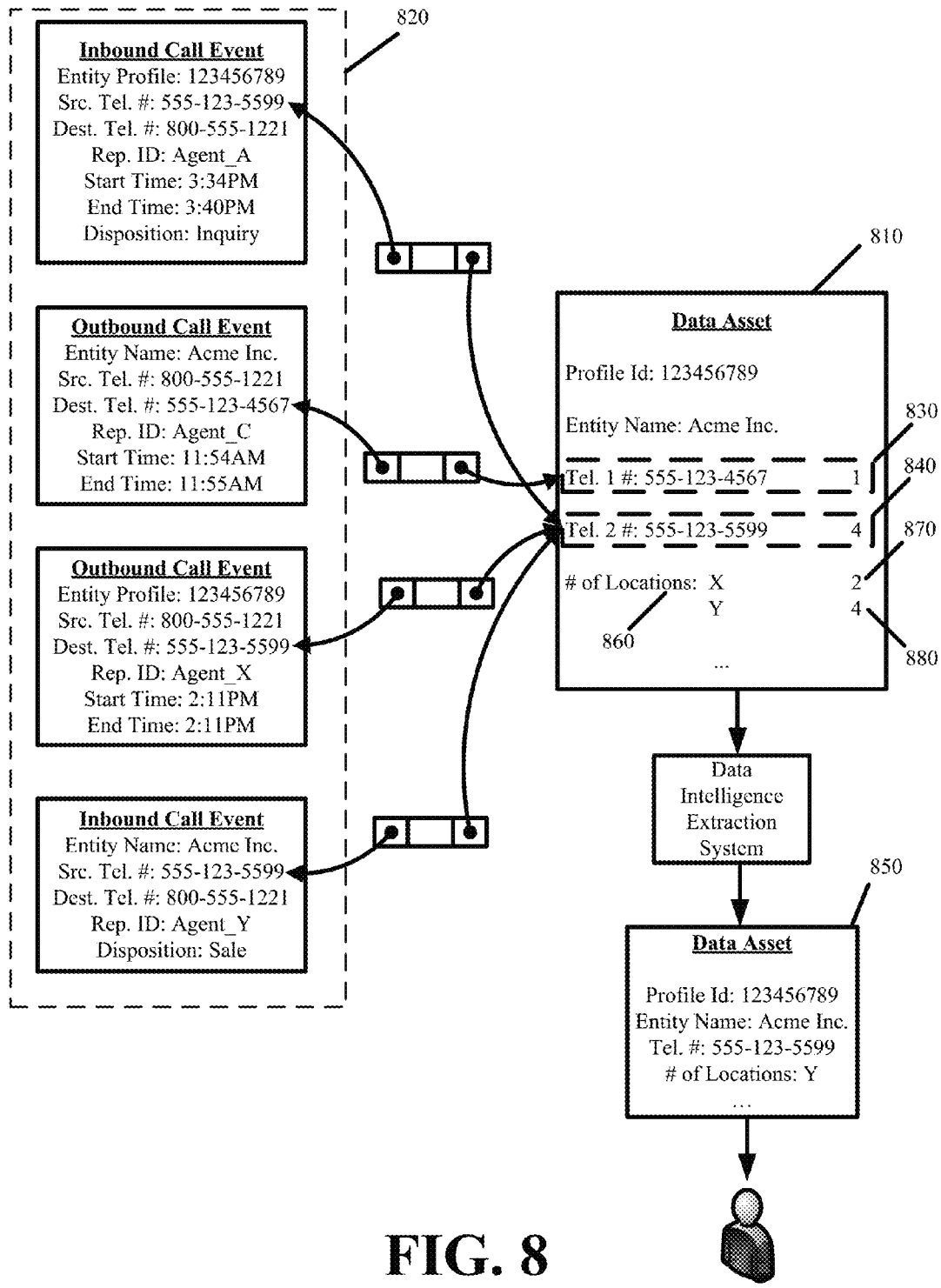
FIG. 8 illustrates the system verifying, in a self-learning manner, data within a data asset based on event quantity in accordance with some embodiments.

FIG. 8 illustrates the system verifying, in a self-learning manner, data within a data asset 810 based on event quantity in accordance with some embodiments. When the system generates the data asset 810 for a particular entity, it populates the data asset 810 with data from any events 820 that are matched to that particular entity. Over time, new matched events may contain data that was already entered to the particular entity data asset 810. Event quantity is based on this repeated identification of data by the system. The repeat data provides the system with an indication of the data's validity. Accordingly, when an item of data from an event is already entered to the data asset 810, the system updates a quantity count for that item of data in the data asset 810. In this manner, the data asset 810 can track the number of instances that item of data has been used or reported in the business or enterprise. In some embodiments, the counts are internal values that are hidden when presenting the data asset.

As shown in FIG. 8, a first telephone number 830 has a count of one indicating that the first telephone number 830 was identified and collected from only a single event, whereas a second telephone number 840 has a count of four indicating that the second telephone number 840 was identified and collected from four separate business generated events.

From these counts, the system is able to determine in a self-learning manner that the second telephone number 840 is the primary number used to contact the particular entity. Consequently, in some embodiments, the system may prioritize the data within the data asset 810. In some embodiments, the system may remove the first telephone number 830 altogether from the data asset 810 as it may have been a disconnected, wrong, or improper number with which to contact the particular entity. Alternatively, the system may obscure the first telephone number 830 from the presentation of the data asset 810, but nevertheless maintain the first telephone number 830 for tracking purposes. Thus, the system may generate a verified data asset 850 from the original data asset 810 to include only data that has been verified when presenting data to a user.

Event quantity can also be used to verify data accuracy in a self-learning manner. This is especially useful when the data asset includes divergent data values for the same item of data. As shown in FIG. 8, the data asset includes a particular item of data 860 for the number of locations operated by the particular entity. This particular item of data 860 however is populated with two diverging values 870 and 880. A first value 870 for the particular item of data 860 has a quantity count of two indicating that the system collected two different events that included the first value 870 for the particular item of data 860. A second value 880 for the particular item of data 860 has a quantity count of four indicating that the system collected four different events that included the second value 880 for the particular item of data 860. Based on these counts, the system is able to determine that the second value 880 is likely twice as valid as the first value 870 for the particular item of data 860. Accordingly, the system may filter or hide the first value 870 when presenting the verified data asset 850 or prioritize the second value 880 over the first value 870 when presenting the verified data asset 850.

Figure 9:
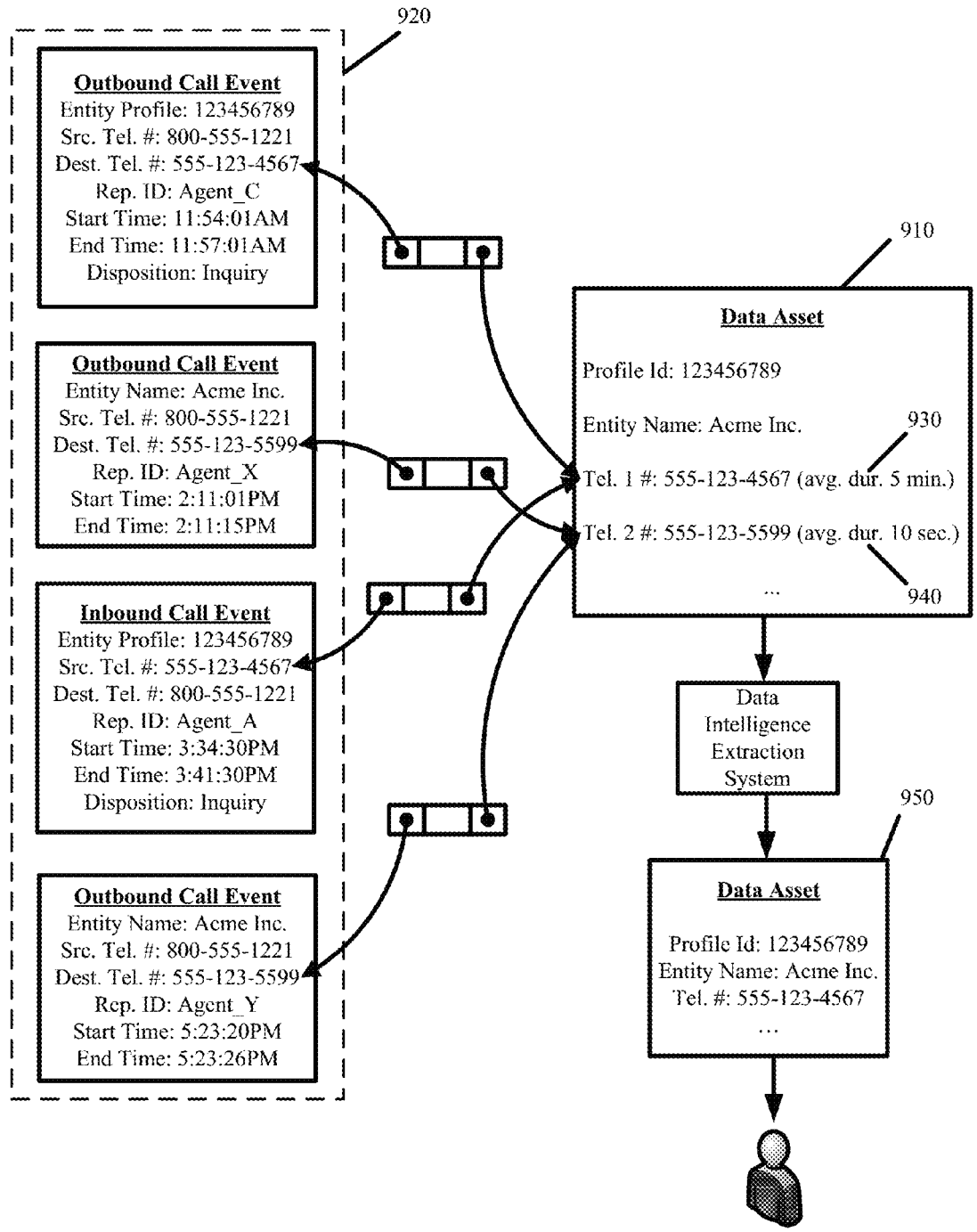
FIG. 9 illustrates the system verifying, in a self-learning manner, data within a data asset based on event quality in accordance with some embodiments.

FIG. 9 illustrates the system verifying, in a self-learning manner, data within a data asset 910 based on event quality in accordance with some embodiments. When the system generates the data asset 910 for a particular entity, it populates the data asset 910 with data from any events 920 that are matched to that particular entity and also appends various metadata to each item of data. The metadata provides quality parameters that the system can subsequently use to assess the quality of different data values for the same or different items of data of the data. In some embodiments, the metadata differs depending on the item of data that is entered to the data asset. As shown in FIG. 9, for each of two telephone numbers entered to the data asset 910, the metadata identifies an average call duration 930 and 940 for a call that is placed to or received from each of the telephone numbers. Specifically, the system identifies that the average call duration to the first telephone number 930 is five minutes and the average call duration to the second telephone number 940 is only ten seconds. Based on this tracked event quality metadata, the system is able to deduce that the first telephone number correctly establishes contact with the particular entity, whereas the second telephone number can be a disconnected, wrong, or otherwise improper telephone number with which to contact the particular entity. Accordingly, the system is able to verify the first telephone number as the primary number and invalidate, filter, or deprioritize the second telephone number. Thus, when generating a verified data asset 950, the system can remove the second telephone number and include only the verified first telephone number in the verified data asset 950. In some embodiments, event quality metadata tracking email open and click rates can be used to verify different email addresses and responses to mailings sent to different mailing addresses can be used to verify different mailing addresses entered to a data asset.

Many of the above-described processes and components are implemented as software processes that are specified as a set of instructions recorded on a non-transitory computer-readable storage medium. When these instructions are executed by one or more computational element(s) (such as processors or other computational elements like ASICs and FPGAs), they cause the computational element(s) to perform the actions indicated in the instructions, thereby transforming a general purpose computer to a specialized machine implementing the methodologies and systems described above. Computer and computer system are meant in their broadest sense, and can include any electronic device with a processor including cellular telephones, smartphones, portable digital assistants, tablet devices, laptops, desktops, and servers. Examples of computer-readable media include, but are not limited to, CD-ROMs, flash drives, RAM chips, hard drives, EPROMs, etc.

Figure 10:
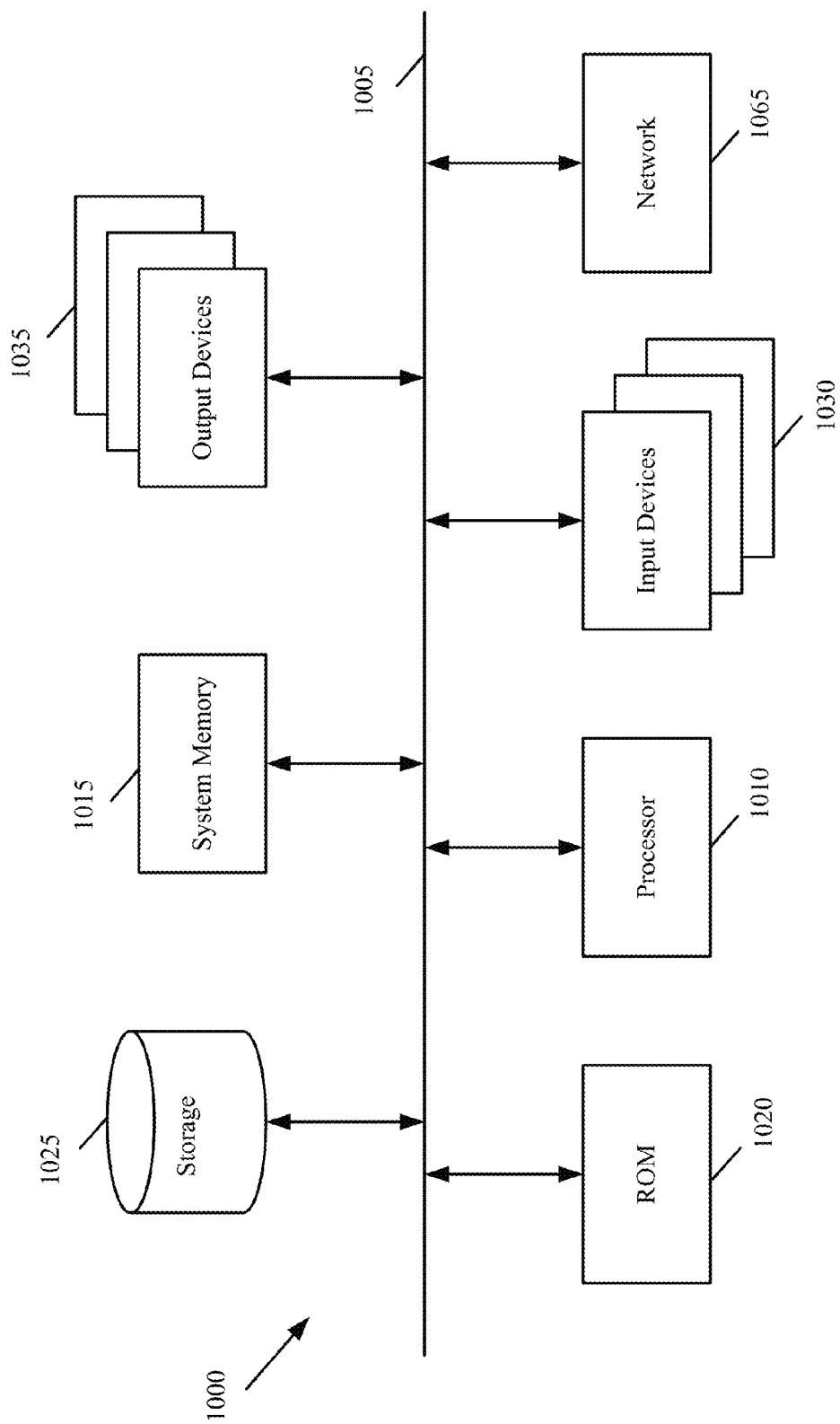
FIG. 10 illustrates a computer system with which some embodiments are implemented.

FIG. 10 illustrates a computer system with which some embodiments of the data intelligence extraction system and its components are implemented. Such a computer system includes various types of computer-readable mediums and interfaces for various other types of computer-readable mediums that implement the various processes, modules, and systems described above. Computer system 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that communicatively connect the numerous internal devices of the computer system 1000. For instance, the bus 1005 communicatively connects the processor 1010 with the read-only memory 1020, the system memory 1015, and the permanent storage device 1025. From these various memory units, the processor 1010 retrieves instructions to execute and data to process in order to execute the processes of the invention. The processor 1010 is a processing device such as a central processing unit, integrated circuit, graphical processing unit, etc.

The read-only-memory (ROM) 1020 stores static data and instructions that are needed by the processor 1010 and other modules of the computer system. The permanent storage device 1025, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1025.

Other embodiments use a removable storage device (such as a flash drive) as the permanent storage device. Like the permanent storage device 1025, the system memory 1015 is a read-and-write memory device. However, unlike the storage device 1025, the system memory is a volatile read-and-write memory, such as random access memory (RAM). The system memory stores some of the instructions and data that the processor needs at runtime. In some embodiments, the processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include any of a capacitive touchscreen, resistive touchscreen, any other touchscreen technology, a trackpad that is part of the computing system 1000 or attached as a peripheral, a set of touch sensitive buttons or touch sensitive keys that are used to provide inputs to the computing system 1000, or any other touch sensing hardware that detects multiple touches and that is coupled to the computing system 1000 or is attached as a peripheral. The input devices 1030 also include alphanumeric keypads (including physical keyboards and touchscreen keyboards), pointing devices. The input devices 1030 also include audio input devices (e.g., microphones, MIDI musical instruments, etc.). The output devices 1035 display images generated by the computer system. The output devices include printers and display devices, such as liquid crystal displays (LCD).

Finally, as shown in FIG. 10, bus 1005 also couples computer 1000 to a network 1065 through a network adapter (not shown). In this manner, the computer can be a part of a network of computers such as a local area network ("LAN"), a wide area network ("WAN"), or an Intranet, or a network of networks, such as the internet. For example, the computer 1000 may be coupled to a web server (network 1065) so that a web browser executing on the computer 1000 can interact with the web server as a user interacts with a GUI that operates in the web browser.

As mentioned above, the computer system 1000 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method comprising:
   generating a plurality of events at a plurality of event generating subsystems of a business, each event generating subsystem automatically generating a set of the plurality of events tracking business activities of a different business unit from a plurality of business units of the business automatically in response to performance of said business activities by the different business unit, wherein generating the plurality of events comprises automatically populating each event of the plurality of events with a timestamp, data resulting from a performed business activity at a time identified by the timestamp, and at least one identifier identifying at least one of an external client, an internal business representative, and an asset involved as part of the performed business activity;
   generating a data asset tracking a cradle-to-grave engagement between a particular external client and each of the plurality of business units of the business by appending the data from a directly linked set of events of the plurality of events to the data asset, wherein each event from the directly linked set of events comprises at least one particular identifier directly identifying the particular external client; and
   updating the data asset with data from an indirectly linked event of the plurality of events, wherein the indirectly linked event omits the particular identifier and has one of a temporal link or a causal link to a directly linked event from the directly linked set of events,
   wherein the temporal link is established from the indirectly linked event timestamp aligning with a timestamp of the directly linked event and the indirectly linked event data comprising at least one value in common with the directly linked event data, and
   wherein the causal link is established from the indirectly linked event data comprising at least one value in common with the directly linked event data and the indirectly linked event resulting from the directly linked event.

2. The method of claim 1 further comprising determining successful conversion of a campaign targeting the particular external client based on the data from the directly linked set of events and the indirectly linked event.

3. The method of claim 1 further comprising communicably coupling to a first event generating subsystem of the business generating a first set of the plurality of events and a second event generating subsystem of the business generating a second set of the plurality of events independent and separate from the first generating subsystem.

4. The method of claim 3 further comprising aggregating to a temporary staging area, the first set of events from a first storage repository of the first event generating subsystem and the second set of events from a second storage repository of the second event generating subsystem operating independent and separate from the first storage repository.

5. The method of claim 3, wherein the first event generating subsystem comprises at least a first machine connected to a telephone system of the business, the first machine generating the first set of events from telephone communications between internal business representatives and a plurality of external clients, each event from the first set of events comprising data about at least one of an inbound call or an outbound call between the business and an external client.

6. The method of claim 5, wherein the second event generating subsystem comprises at least a second machine connected to computer systems of the internal business representatives, the second machine generating the second set of events from activities performed by the internal business representatives on the computer systems.

7. The method of claim 1, wherein the particular identifier comprises any one of the particular external client's name, telephone number, email address, or alphanumeric value uniquely identifying the particular external client from other clients.

8. The method of claim 1 further comprising tracking the cradle-to-grave engagement between the business and the particular external client by further appending to the data asset unique data from any of a directly linked event or an indirectly linked event subsequently generated as a result of a subsequent interaction between the business and the particular external client.

9. The method of claim 1 further comprising generating from the data asset, a report presenting a chain of events leading to a completed sale to the particular external client.

10. The method of claim 1 further comprising tracking within the data asset, a first count identifying a number of instances a first value for particular data is present in the directly linked set of events and the indirectly linked event and a second count identifying a number of instances a second value for the particular data is present in the directly linked set of events and the indirectly linked event.

11. The computer-implemented method of claim 10 further comprising retaining the first value for the particular data within the data asset and excluding the second value for the particular data from the data asset when the first count is greater than the second count.

12. The computer-implemented method of claim 1 further comprising tracking within the data asset, a first count identifying a number of times a first telephone number or a first email address for contacting the particular external client is identified in the directly linked set of events and the indirectly linked event and a second count identifying a number of times a second telephone number or a second email address for contacting the particular external client is identified in the directly linked set of events and the indirectly linked event.

13. The computer-implemented method of claim 12 further comprising (i) configuring the first telephone number or the first email address as the primary method of contacting the particular external client and the second telephone number or the second email address as the secondary method of contacting the particular external client when the first count exceeds the second count and (ii) configuring the second telephone number or the second email address as the primary method of contacting the particular external client and the first telephone number or the first email address as the secondary method of contacting the particular external client when the second count exceeds the first count.

14. The computer-implemented method of claim 1 further comprising identifying from the data asset, sale of a particular good or service to the particular external client and characteristics of the particular external client.

15. The computer-implemented method of claim 14 further comprising sending a marketing campaign promoting the particular good or service to a potential client with similar characteristics to the particular external client.

* * * * *